(12) United States Patent
Kim et al.

(10) Patent No.: US 8,010,162 B2
(45) Date of Patent: Aug. 30, 2011

(54) MOBILE COMMUNICATION TERMINAL AND METHOD OF DISPLAYING INFORMATION USING THE SAME

(75) Inventors: In Hwan Kim, Seoul (KR); Chang Soo Kim, Anyang-si (KR); Kwang Hyo Son, Guri-si (KR)

(73) Assignee: LG Electronics Inc., Seoul (KR)

( * ) Notice: Subject to any disclaimer, the term of this patent is extended or adjusted under 35 U.S.C. 154(b) by 660 days.

(21) Appl. No.: 12/130,743

(22) Filed: May 30, 2008

(65) Prior Publication Data

US 2008/0300023 A1 Dec. 4, 2008

(30) Foreign Application Priority Data

Jun. 1, 2007 (KR) .......................... 10-2007-0053818

(51) Int. Cl.
*H04B 1/38* (2006.01)

(52) U.S. Cl. ....................................................... 455/566

(58) Field of Classification Search .................... 455/566
See application file for complete search history.

(56) References Cited

U.S. PATENT DOCUMENTS

2002/0160817 A1* 10/2002 Salmimaa et al. ............. 455/566
2003/0203731 A1* 10/2003 King et al. .................... 455/407

* cited by examiner

*Primary Examiner* — Lester Kincaid
*Assistant Examiner* — Joel Ajayi
(74) *Attorney, Agent, or Firm* — Birch, Stewart, Kolasch & Birch, LLP

(57) ABSTRACT

A mobile communication terminal including an input unit, a display unit, a receiving unit configured to receive a signal including at least one interactive function, a memory configured to store at least one symbol indicating a type of the at least one interactive function, and a control unit configured to detect the type of the interactive function included in the signal received by the receiving unit, to search the memory for the symbol indicating the at least one interactive function, to control the display unit to display the searched symbol, and to control an operation of the interactive function according to a signal provided via the input unit.

30 Claims, 15 Drawing Sheets

MOBILE COMMUNICATION TERMINAL AND METHOD OF DISPLAYING INFORMATION USING THE SAME

The present application claims the benefit of the Korean Patent Application No. 10-2007-0053818, filed on Jun. 1, 2007, which is hereby incorporated by reference as if fully set forth herein.

BACKGROUND OF THE INVENTION

1. Field of the Invention

The present invention relates to a mobile communication terminal, and more particularly, to a mobile communication terminal and corresponding method of differently displaying at least one or more interactive functions according to a type of the interactive function.

2. Discussion of the Related Art

Mobile terminals now provide many additional services beside the basic call service. For example, users can now access the Internet, play games, watch videos, listen to music, capture images and videos, record audio files, etc. Mobile terminals also now provide broadcasting programs such that user can watch television shows, sporting programs, videos, etc.

Mobile terminals also include interactive services that use a user's participation. Thus, data based on the result of the terminal user's participation are transmitted and received via the terminal. For example, FIG. 1 illustrates a related art method of using an interactive function in a mobile terminal.

As shown in FIG. 1, an interactive function 10 is displayed on a broadcast image when the user is viewing a current broadcast. For instance, the interactive function 10 can be a function for purchasing items contained in the broadcast. When the interactive function 10 is displayed to the user, the display also includes an icon 20 indicating the interactive function 10 is displayed. However, the information displayed to the user is very limited and does not provide any more information that may be useful to the user.

SUMMARY OF THE INVENTION

Accordingly, one object of the present invention is to address the above-noted and other drawbacks.

Another object of the present invention is to provide a mobile communication terminal and corresponding method that discriminately displays a currently implemental interactive function differently according to a type of the interactive function.

Another object of the present invention is to provide a mobile communication terminal and corresponding method of displaying information that allows a user to easily determine the type of currently implemental interactive function.

To achieve these objects and other advantages and in accordance with the purpose of the invention, as embodied and broadly described herein, the present invention provides in one aspect a mobile communication terminal including an input unit, a display unit, a receiving unit configured to receive a signal including at least one interactive function, a memory configured to store at least one symbol indicating a type of the at least one interactive function, and a control unit configured to detect the type of the interactive function included in the signal received by the receiving unit, to search the memory for the symbol indicating the at least one interactive function, to control the display unit to display the searched symbol, and to control an operation of the interactive function according to a signal provided via the input unit.

In another aspect, the present invention provides a method of controlling a mobile communication terminal, which includes receiving a signal including at least one interactive function, storing at least one symbol indicating a type of the at least one interactive function in a memory of the terminal, detecting the type of the interactive function included in the received signal, searching the memory for the symbol indicating the at least one interactive function, displaying the searched symbol on a display unit of the terminal, and controlling an operation of the interactive function according to a signal provided via an input unit of the terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

Figure 2:
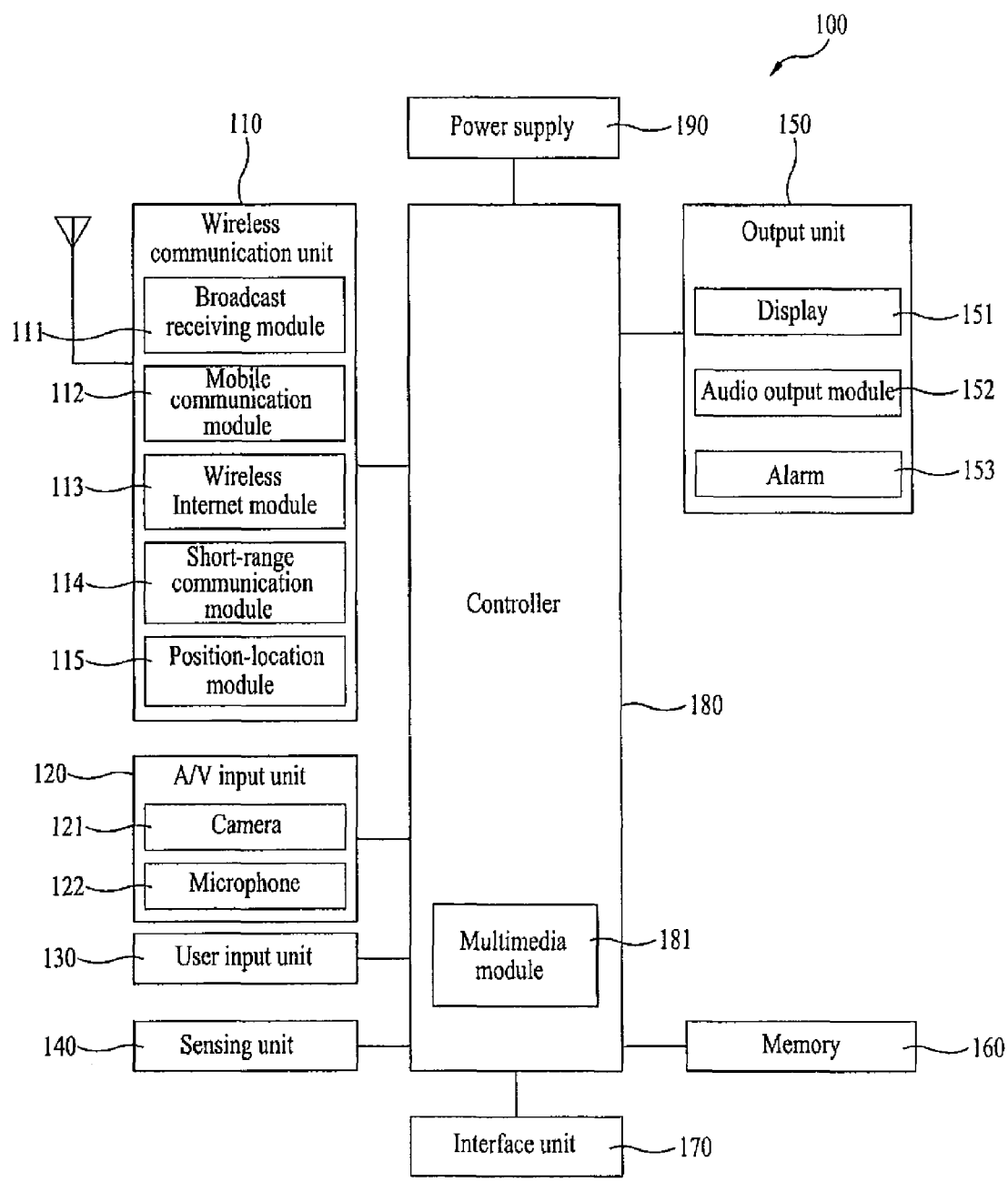
FIG. 2 is a block diagram of a terminal according to an embodiment of the present invention.

FIG. 2 is a block diagram of mobile terminal 100 according to an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals.

In addition, FIG. 2 shows the mobile terminal 100 having various components, but implementing all of the illustrated components is not a requirement. Greater or fewer components may alternatively be implemented. FIG. 2 also shows a wireless communication unit 110 configured with several commonly implemented components. For instance, the wireless communication unit 110 may include one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. Further, the broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc.

For instance, broadcast associated information may include an electronic program guide (EPG) of digital multimedia broadcasting (DMB) and electronic service guide (ESG) of digital video broadcast-handheld (DVB-H). The broadcast signal may be implemented as a TV broadcast signal, a radio broadcast signal, and a data broadcast signal, among others. If desired, the broadcast signal may further include a broadcast signal combined with a TV or radio broadcast signal.

In addition, the broadcast receiving module 111 may be configured to receive broadcast signals transmitted from various types of broadcast systems. By a nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

Further, the mobile communication module 112 transmits/receives wireless signals to/from one or more network entities (e.g., base station, Node-B). Such signals may represent audio, video, multimedia, control signaling, and data, among others.

The wireless Internet module 113 supports Internet access for the mobile terminal, and may be internally or externally coupled to the terminal. Further, the short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

Also, the position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera 121 receives and processes image frames of still pictures or video.

Further, the microphone 122 receives an external audio signal while the portable device is in a particular mode, such as phone call mode, recording mode and voice recognition. This audio signal is processed and converted into digital data. The portable device, and in particular, the A/V input unit 120, includes assorted noise removing algorithms to remove noise generated in the course of receiving the external audio signal.

In addition, data generated by the A/V input unit 120 may be stored in the memory 160, utilized by the output unit 150, or transmitted via one or more modules of the communication unit 110. Two or more microphones and/or cameras may be used.

Also, the user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

Further, the sensing unit 140 provides status measurements of various aspects of the mobile terminal. For instance, the sensing unit 140 may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal.

As an example, when the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device, etc.

The interface unit 170 may be implemented to couple the mobile terminal with external devices. Typical external devices include wired/wireless headphones, external chargers, power supplies, storage devices configured to store data (e.g., audio, video, pictures, etc.), earphones, and microphones, among others. Also, the interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

In addition, the output unit 150 includes various components which support the output requirements of the mobile terminal. Further, the display 151 is implemented to visually display information associated with the mobile terminal 100. For instance, if the mobile terminal 100 is operating in a phone call mode, the display 151 will generally provide a user interface or graphical user interface which includes information associated with placing, conducting, and terminating a phone call.

As another example, if the mobile terminal 100 is in a video call mode or a photographing mode, the display 151 may additionally or alternatively display images which are associated with these modes. One particular implementation includes the display 151 configured as a touch screen working in cooperation with an input device, such as a touchpad. This configuration permits the display to function both as an output device and an input device.

The display 151 may also be implemented using known display technologies including, for example, a liquid crystal display (LCD), a thin film transistor-liquid crystal display (TFT-LCD), an organic light-emitting diode display (OLED), a flexible display and a three-dimensional display. Further, the mobile terminal may include one or more of such displays.

An example of a two-display embodiment is one in which one display is configured as an internal display (viewable when the terminal is in an opened position) and a second display configured as an external display (viewable in both the open and closed positions).

Next, FIG. 2 illustrates the output unit 150 having an audio output module 152, which supports the audio output requirements of the mobile terminal 100. Further, the audio output module 152 is often implemented using one or more speakers, buzzers, other audio producing devices, and combinations thereof. The audio output module 152 functions in various modes including call-receiving mode, call-placing mode, recording mode, voice recognition mode and broadcast reception mode.

During operation, the audio output module 152 outputs audio relating to a particular function (e.g., call received, message received, and errors). Also, the output unit 150 includes an alarm 153, which is used to signal or otherwise identify the occurrence of a particular event associated with the mobile terminal.

Typical events include call received, message received and user input received. An example of such output includes the providing of tactile sensations (e.g., vibration) to a user. For instance, the alarm 153 may be configured to vibrate responsive to the mobile terminal receiving a call or message. As another example, a vibration is provided by the alarm 153 responsive to receiving user input at the mobile terminal, thus providing a tactile feedback mechanism. Further, various output provided by the components of output unit 150 may be separately performed, or such output may be performed using any combination of such components.

In addition, the memory 160 is used to store various types of data to support the processing, control, and storage requirements of the mobile terminal. Examples of such data include program instructions for applications operating on the mobile terminal, contact data, phonebook data, messages, pictures, video, etc.

Further, the memory 160 stores a digital broadcast signal received via the digital broadcast receiving module 111. The broadcast program information such as an EPG, ESG and the like and an interactive function and the like can be contained in the broadcast signal stored in the memory 160.

In addition, information indicating a type of an interactive function according to an embodiment of the present invention is stored in the memory 160. In the following detailed description of the present invention, the information is referred to as a symbol.

That is, the symbol is an indication indicating a type of the interactive function and includes at least one of an icon shape selected from a text, an image, an icon, a 3-dimensional image and an animation or any combination thereof. Further, the name of information indicating a type of an interactive function according to the present invention is not limited to the symbol only.

Also, the symbol information is stored as a default in the memory 160 when the terminal 100 is launched. The symbol information is also obtained via the digital broadcast receiving module 111 via a broadcasting network or obtained using one of the mobile communication module 112, the wireless internet module 113 and the short-range communication module 114, for example.

An example of obtaining the symbol information from the broadcasting network will now be explained. First, the symbol information can be obtained via a currently played broadcast channel received via the broadcast receiver 111, another broadcast channel, broadcast program information such as the ESG and EPG, or the like.

When the symbol information is obtained from the currently played broadcast channel, image type information displayed on the currently played broadcast image can be downloaded and stored. Alternatively, the symbol information can be downloaded and stored per program or image or with a predetermined time interval.

For the mobile communication network, the symbol information provided by a communication service provider of the terminal 100 or other communication service providers can be downloaded and stored. Also, for the Internet network, the symbol information can be downloaded from a server providing the symbol information indicating a type of an interactive function and then stored.

In addition, the memory 160 shown in FIG. 2 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

Further, the controller 180 controls the overall operations of the mobile terminal 100. For instance, the controller 180 performs the control and processing associated with voice calls, data communications, video calls, camera operations and recording operations. In addition, the controller 180 controls symbol information indicating a type of an interactive function to be displayed via the display 151.

The controller 180 may also include a multimedia module 181 which provides multimedia playback. The multimedia module 181 may be configured as part of the controller 180, or may be implemented as a separate component.

In addition, the power supply 190 provides power required by the various components for the portable device. The provided power may be internal power, external power, or combinations thereof.

Figure 3:
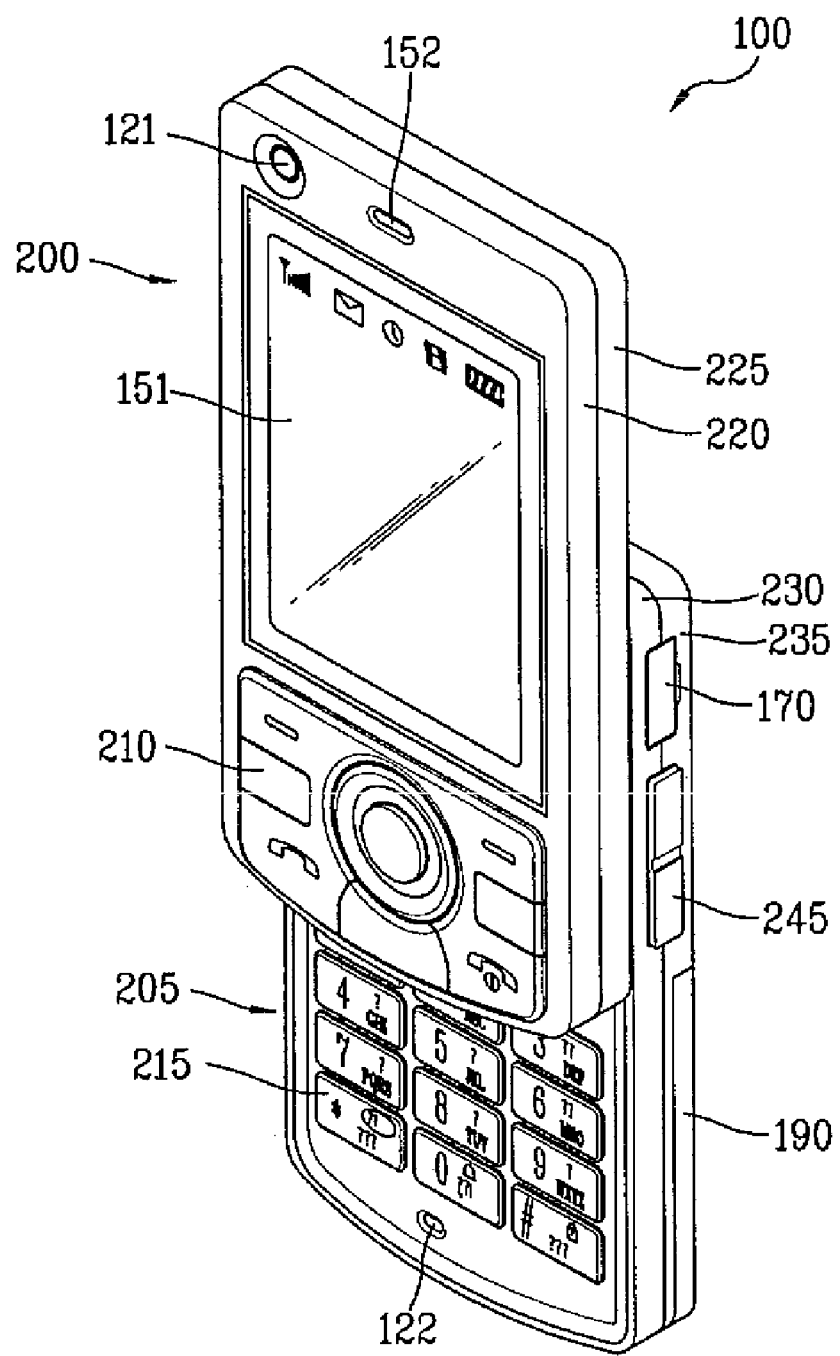
FIG. 3 is a front perspective view of a terminal according to an embodiment of the present invention.

Next, FIG. 3 is a front side view of the mobile terminal 100 according to an embodiment of the present invention. As shown in FIG. 3, the mobile terminal 100 includes a first body 200 configured to slideably cooperate with a second body 205. The user input unit 130 described in FIG. 2 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 4:
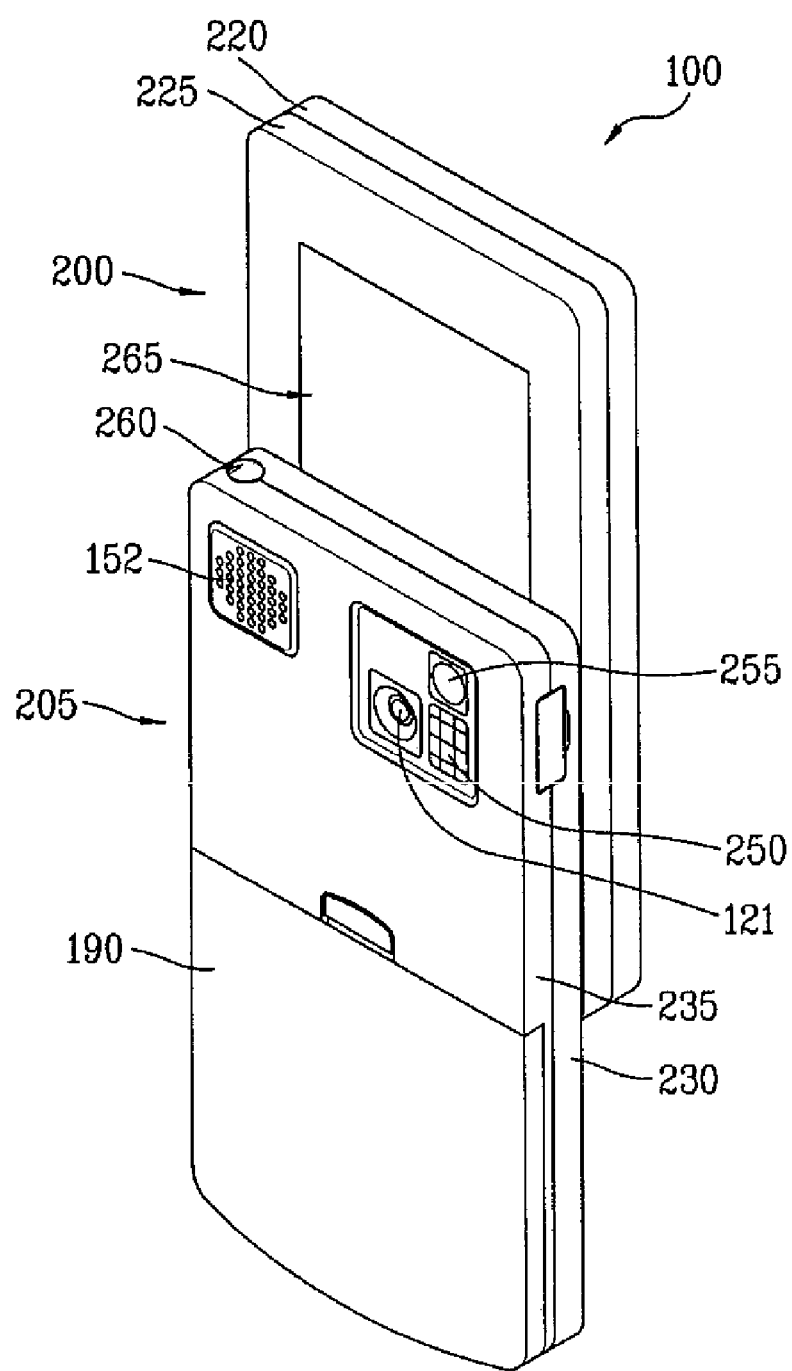
FIG. 4 is a rear perspective view of the terminal shown in FIG. 3 according to an embodiment of the present invention.

FIG. 4 is a rear side view of the mobile terminal 100 shown in FIG. 3. As shown in FIG. 4, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 2). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 2-4 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 5:
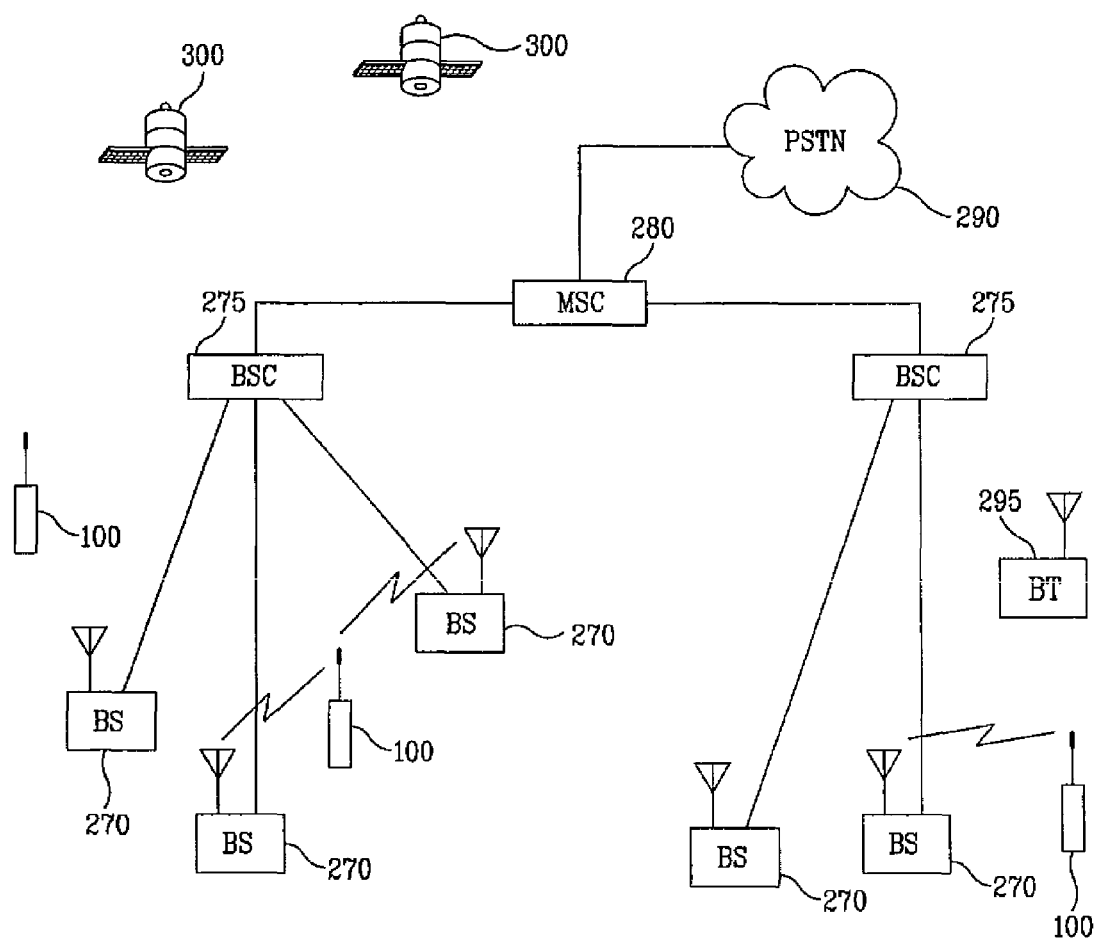
FIG. 5 is a block diagram of a CDMA wireless communication system operable with the terminal of FIGS. 2 to 4 according to an embodiment of the present invention.

Next, FIG. 5 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

Figure 1:
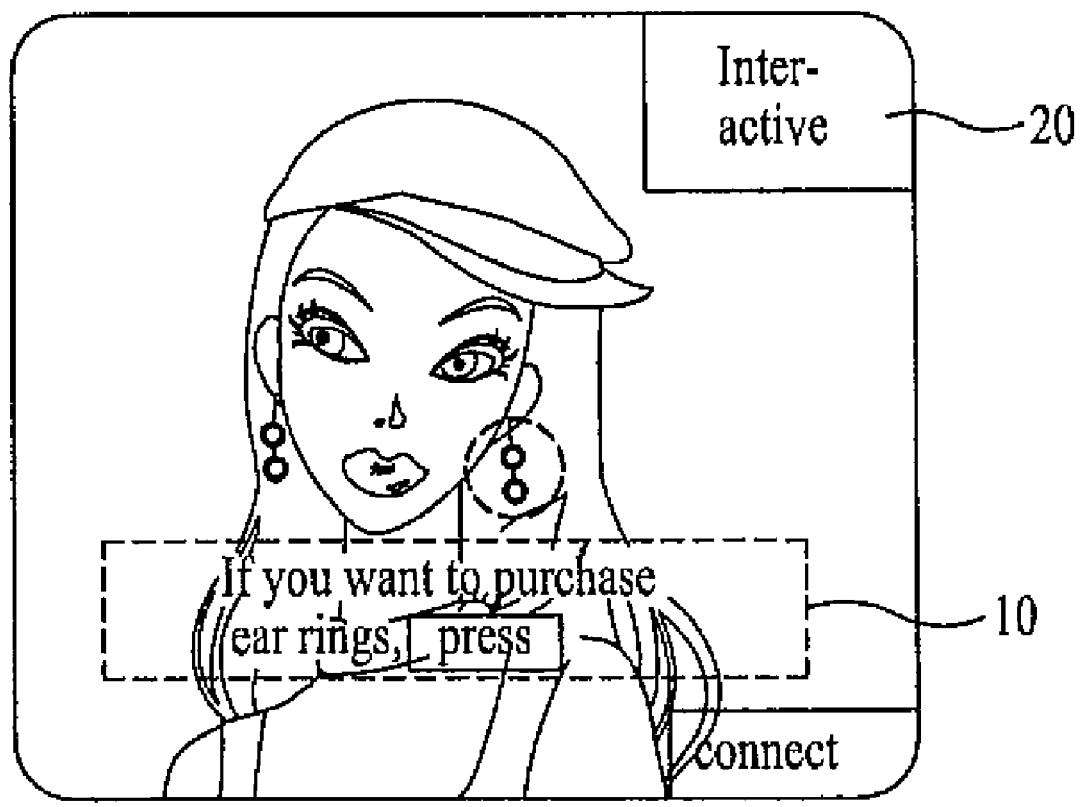
FIG. 1 is an overview of a related art display screen displaying an interactive function.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 5 further illustrates several global positioning system (GPS) satellites 300. Such satellites facilitate locating the position of some or all of the mobile terminals 100. In FIG. 5, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Figure 6:
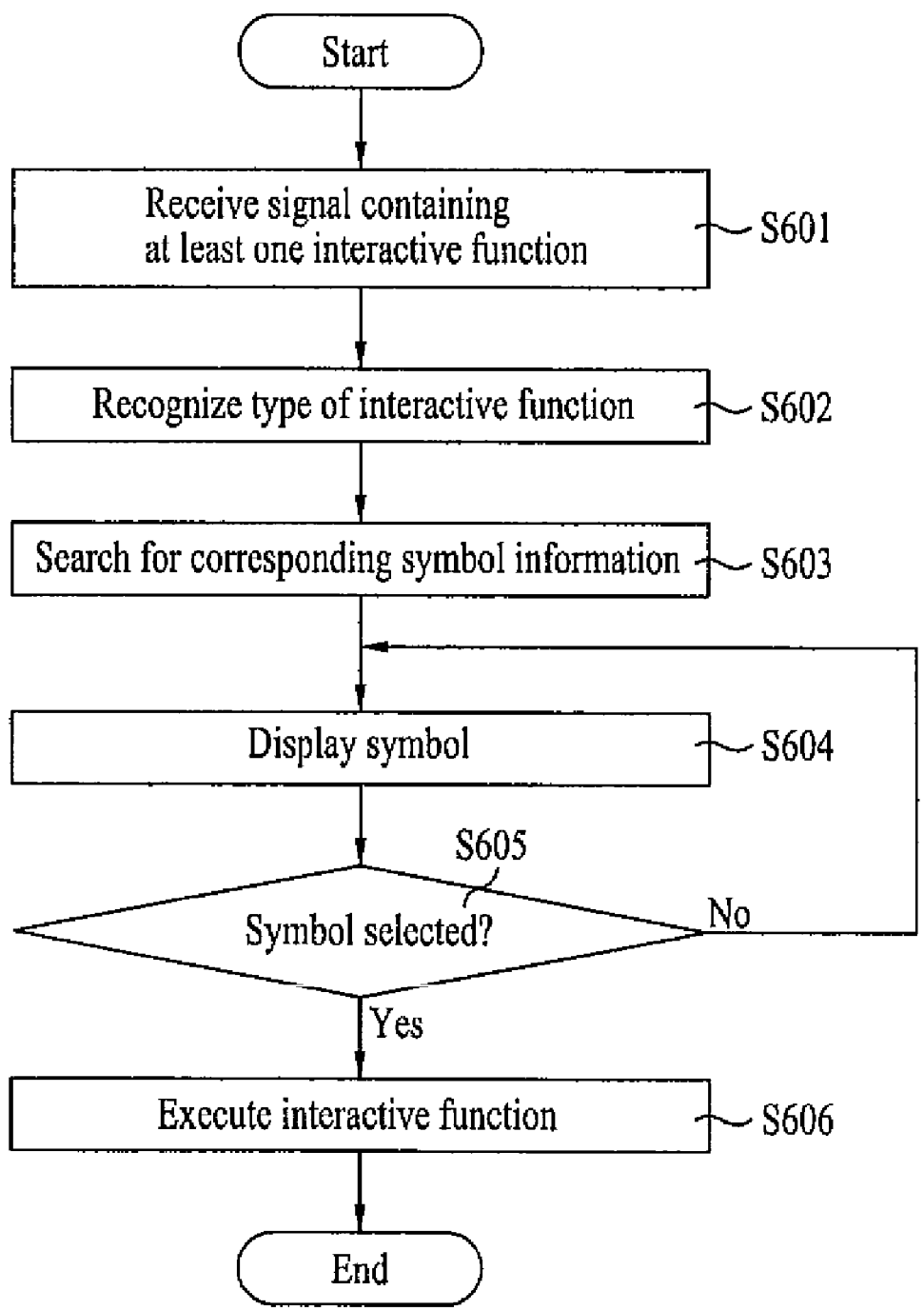
FIG. 6 is a flowchart illustrating a method of displaying information in a terminal according to an embodiment of the present invention.

Next, FIG. 6 is a flowchart illustrating a method of displaying information in a mobile terminal according to one embodiment of the present invention. FIG. 2 will also be referred to in this description.

Figure 7:
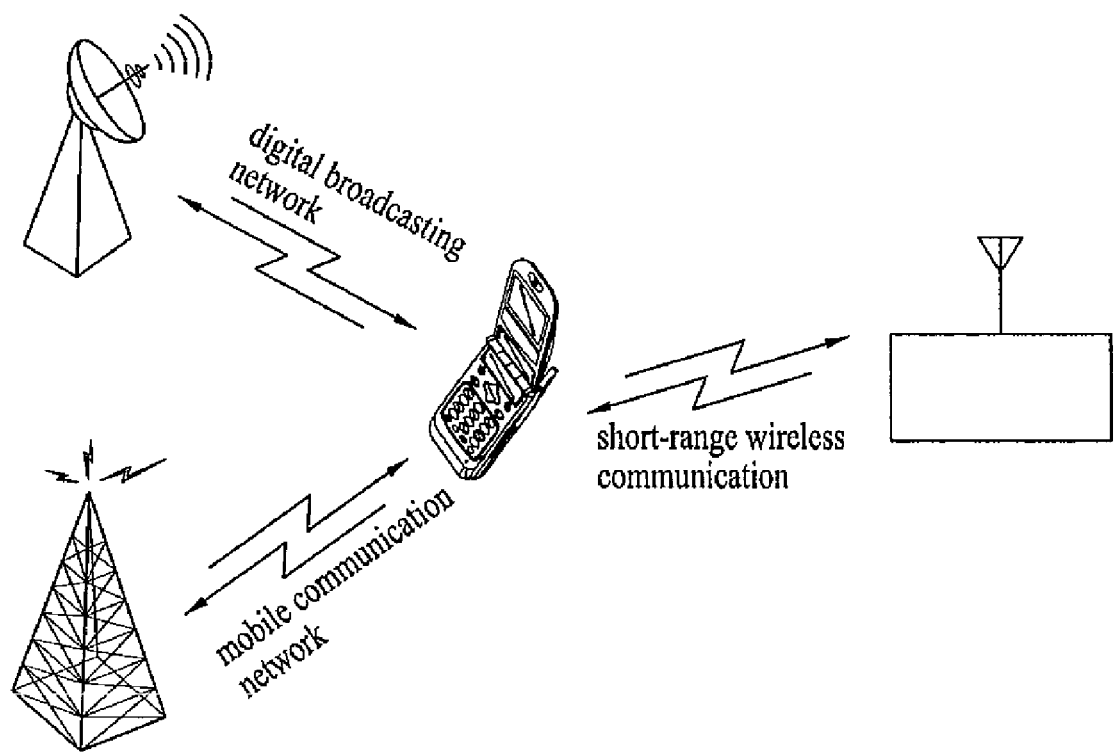
FIG. 7 is an overview illustrating various networks for a mobile communication terminal according to an embodiment of the present invention.

As shown in FIG. 6, the mobile terminal 100 (e.g., the communication unit 110) receives a signal containing at least one interactive function. The signal containing the at least one interactive function, as shown in FIG. 7, includes a mobile communication signal provided via a mobile communication network, a digital broadcast signal provided via a digital broadcasting network or a short-range wireless communication signal provided via a short-range wireless communication network.

In the following description, the interactive function is contained in a digital broadcast signal provided via a digital broadcasting network. Further, in the present embodiment, a single display device is divided into two areas and then information is displayed according to a different operation via each of the two areas. In addition, when a terminal has at least two physically divided display devices, the terminal can implement operations of the present invention via the different display devices as well.

Further, the digital broadcast signal may be a broadcast signal received in real time or a signal generated by playing a broadcast signal stored in a memory. Also, the digital broadcast signal can include any broadcast signal containing an interactive function. For example, the digital broadcast signal can include a TV broadcast signal, a digital radio broadcast signal and a digital data broadcast signal. Namely, an interactive function can be executed by an externally provided signal or a signal stored in the terminal 100.

In addition, the interactive function can include any one form of a message sending operation, a phone call connection operation, a wireless Internet connection operation, a voting operation, an information upload/download operation, a video communication operation and the like.

Also, if the user of the terminal performs a manipulation for a real-time digital broadcast reception or a playback of a stored digital broadcast signal or if an external signal containing at least one interactive function is received via the broadcast signal receiving unit 111, the controller 180 plays back the signal containing the at least one interactive function via the display 151.

In addition, when displaying an interactive function synchronized with a currently played broadcast scene on the display 151, the controller 180 recognizes the type of the interactive function (S602). Further, the controller 180 searches the information stored in the memory 160 for a symbol indicating the recognized type of the interactive function (S603). As mentioned above, the symbol can include any one from an image, icon, emoticon, avata, text, 3-dimensional image, and animation character having action information, which symbolizes the corresponding interactive function.

Further, the controller 180 displays the searched symbol on a prescribed area of the screen of the terminal 100 (S603). Also, when the symbol is displayed on the screen on which the corresponding broadcast is being played, the displayed symbol may interrupt the user's viewing of the broadcast. Therefore, it is preferable that the symbol is displayed on a marginal space of the screen outside of the area reserved for playing a broadcast.

For instance, if the recognized interactive function is 'phone call connection' function with a home shopping marketer, the controller 180 can display 'phone call connection' text, a telephone symbol or a 3-dimensional image symbol depicting a specific character answering a phone among the symbols.

In addition, instead of directly displaying the symbol searched in step S603 on the broadcast image, the controller 180 can display the searched symbol when a user makes a key input via the input unit 130. Also, while the symbol is displayed according to the user's key input, if the user makes another key input, the user can interrupt the displaying of the symbol.

Further, if the display 151 is a touchscreen type display, the controller 180 can modify a display position of the symbol according to a touch action of the user. Also, when one or more symbols are displayed, the controller 180 can also modify a display arrangement of the symbols.

Further, the controller 180 can display the symbol in a manner of being overlaid on a broadcast play image, display the symbol to be periodically blinking, display the symbol using an OSD (on screen display) or display the symbol semi-transparently, whereby a user can quickly recognize the corresponding symbol.

In addition, when the controller finds a plurality of symbols in the searching step S603, the controller 180 can display the found symbols to be discriminated from each other according to one of a preset priority, a frequency and a significance. Also, information on the priority, frequency or significance of each of the symbols is preferably pre-stored in the memory 160.

For instance, the controller 180 can display the symbols by setting a brightness of the symbol belonging to a higher priority within the preset priorities to a highest value, setting a brightness of the symbol belonging to a middle priority to a median value, and setting a brightness of the symbol belonging to a lower priority to a minimum value.

Alternatively, the controller 180 can display the symbols in a list, grid or rotation style on an external area except the broadcast play area. Further, as discussed above, the symbol may be received via one of a broadcasting network, a mobile communication network and the Internet, or can be stored in the memory as a default.

In addition, in some instances, if a specific key signal is input from the input unit 130, the controller 180 can display the symbol for a predetermined duration only. If necessary, the controller 180 can also control a type of an interactive function corresponding to the searched symbol to be output as vibration or sound.

Further, as mentioned above, the controller 180 divides the broadcast play image into a first area (main display area) and a second area (sub-display area). The controller 180 then plays the broadcast on the first area and displays a plurality of the symbols in a list, grid or rotation style on the second area.

If an interactive function corresponding to the searched symbol is a 'phone call connection' operation, the controller 180 can also output a voice message in step S604 such as 'phone call is connectible' or output a bell sound or the like by controlling the audio output module 152.

Also, if a user selects a symbol using the input module 130 (Yes in S605), the controller 180 executes an interactive function corresponding to the selected symbol (S606). For instance, when an interactive function corresponding to the symbol is a 'phone call connection' function to a home shopping marketer, and if the symbol is selected, the controller 180 connects the phone call to the marketer via the RF unit 112.

After the interactive function has been executed in the above manner, the controller 180 can store content relevant to the executed interactive function in the memory 160. For instance, if the executed interactive function is the 'phone call connection' function with the marketer, the controller 180 can store a phone number of the marketer in the memory 160.

In addition, if a symbol is selected, the controller 180 can also display detailed information of an interactive function corresponding to the selected symbol on a prescribed are of the broadcast play image. For instance, when the interactive function corresponding to the symbol is the 'phone call connection' function with the marketer, and if the symbol is selected, the controller 180 can display the detailed information including an address of the marketer, a phone number of the marketer, a name of the marketer and information on a product to be purchased and the like on the prescribed area of the broadcast play image.

In addition, when displaying the detailed information, if the detailed information is being updated via a currently received broadcast signal or completely updated, the controller 180 can display corresponding information as a message or an image on the broadcast play image or a prescribed area.

Further, various display forms of a symbol indicating a type of an interactive function according to the present invention will now be explained in more detail with reference to FIGS. 8(a) to 8(l). For example, FIG. 8(a) shows an example in which the interactive functions include a product information download function 410, a message sending function 420 to a marketer and a phone call connection function 430 with a marketer.

In this example, the controller 180 reads symbols indicating the respective interactive functions from the memory 160 and then displays the symbols indicating the download function 410, the message sending function 420 and the phone call connection function 430 on the broadcast image.

Figure 8A:
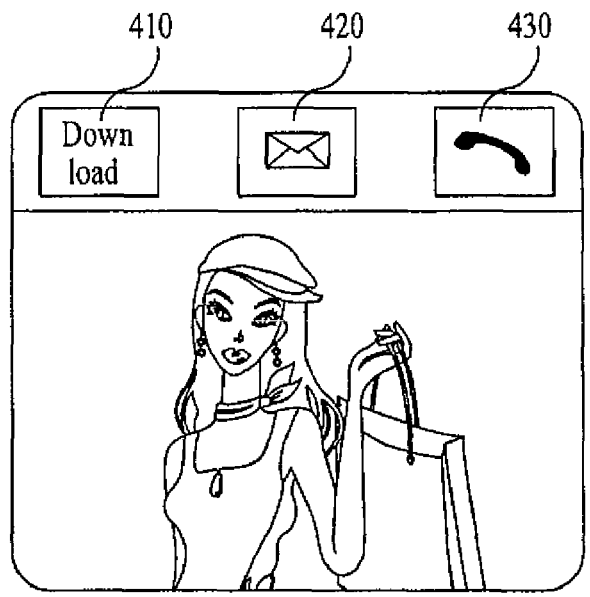
FIGS. 8(a) to 8(l) are overviews illustrating display screens to describe a process for displaying icons indicating types of interactive functions according to an embodiment of the present invention.

Further, the symbol can have a shape indicating each of the functions 410, 420 and 430 shown in FIG. 8(a) or may be implemented as any one of text, 3-dimensional image and animation. As discussed above, the controller 180 can also display the symbol as being overlaid on a broadcast play image, as blinking periodically, semi-transparently or using an OSD (on screen display), whereby a user is enabled to recognize the corresponding symbol quickly.

Figure 8B:
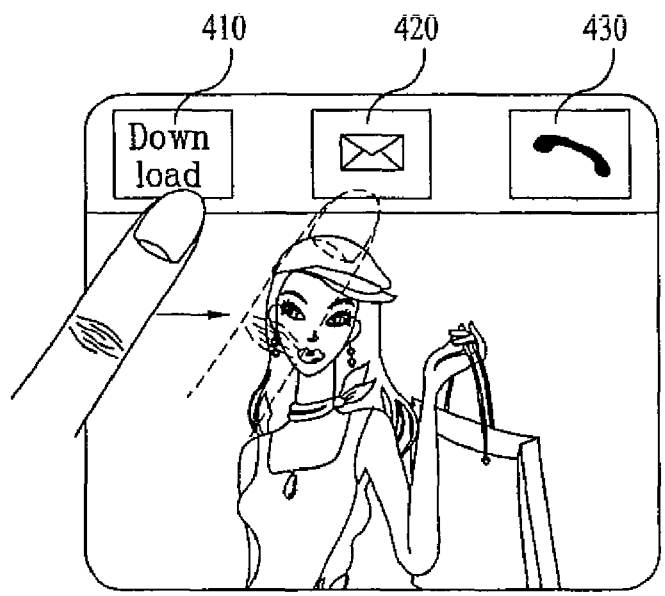
Figure 8C:
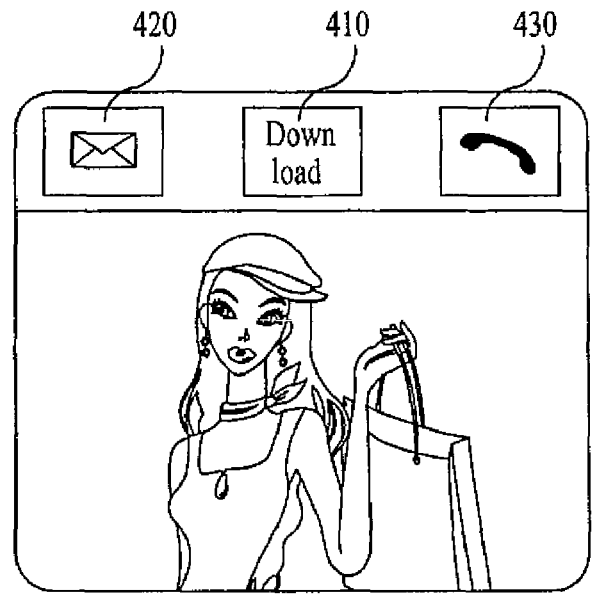

Also, when the display 151 includes a touchscreen, and as shown FIG. 8(b), when the user touches and drags the download symbol 410 to the message symbol 420, the controller 180 can switches the display arrangements of the symbols 410 and 420, as shown in FIG. 8(c). That is, according to a touch action made by a user, the controller 180 can freely shift and modify the arrangement of the symbols 410, 420 and 430.

Further, as discussed above, the display area can be divided into first and second areas. In this instance, the controller 180 can play the home shopping relevant broadcast in the first area, while the symbols 410, 420 and 430 are displayed in the second area. Further, the controller 180 can display the symbols in the second area in a list, grid or rotation style.

Figure 8D:
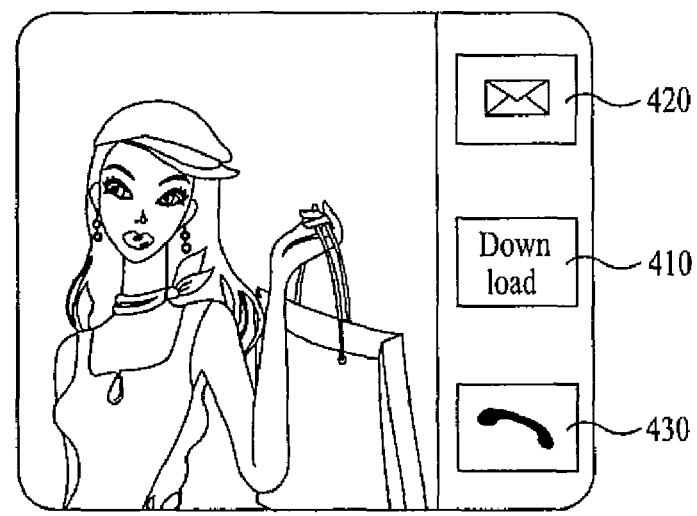
Figure 8E:
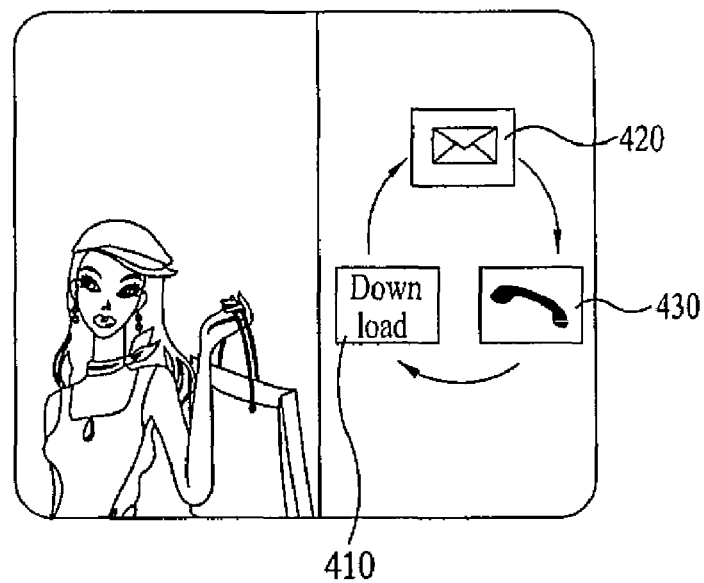

For example, FIG. 8(d) illustrates one example in which the controller 180 displays the symbols 410, 420 and 430 in a list style in the second area, and FIG. 8(e) illustrates another example in which the controller 180 displays the symbols 410, 420 and 430 in a rotation style in the second area.

Figure 8F:
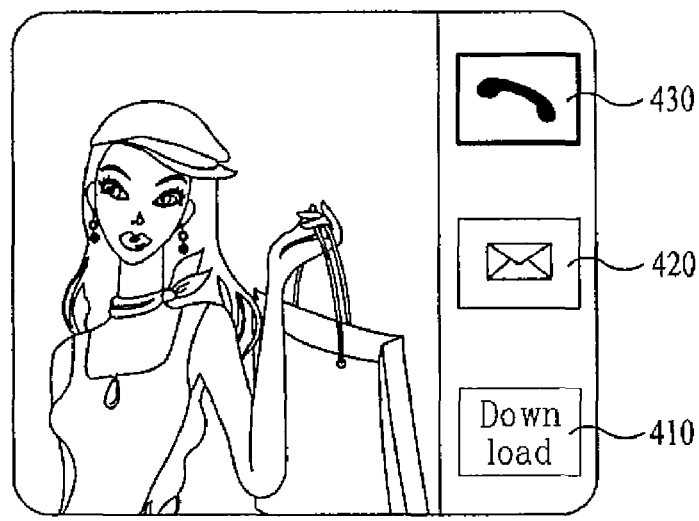

FIG. 8(f) illustrates another example in which the controller 180 displays the symbols 410, 420 and 430 to be discriminated from each other according to one of a priority, a frequency and significance preset by a user. For instance, if the user sets up priorities in order of the phone symbol 430> the message symbol 420> the download symbol 410 via the appropriate menu options provided the mobile terminal of the present invention, the controller 180 advantageously controls the brightness of the displayed symbols according to the set priority. In particular, the brightness of the phone symbol 430 is displayed as the maximum brightness, the brightness of the message symbol 420 is displayed as the medium brightness, and the brightness of the download symbol 410 is displayed as the minimum brightness.

Figure 8G:
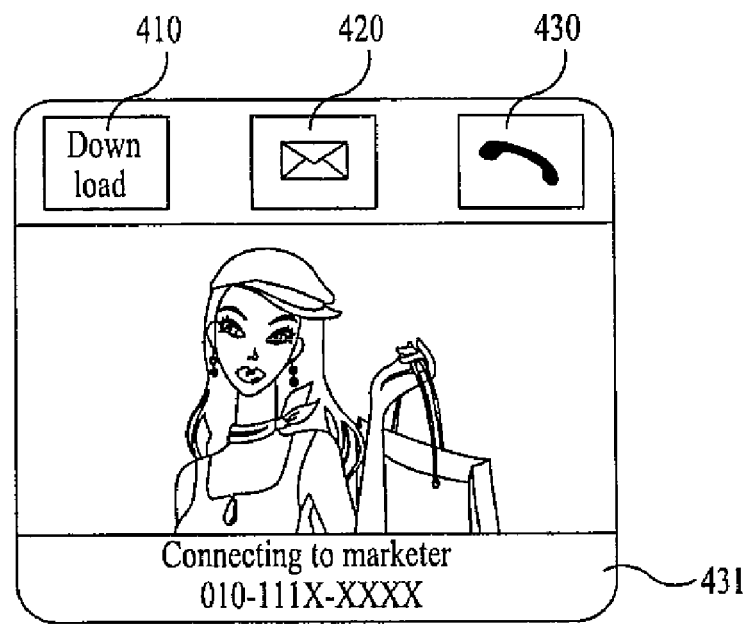
Figure 8H:
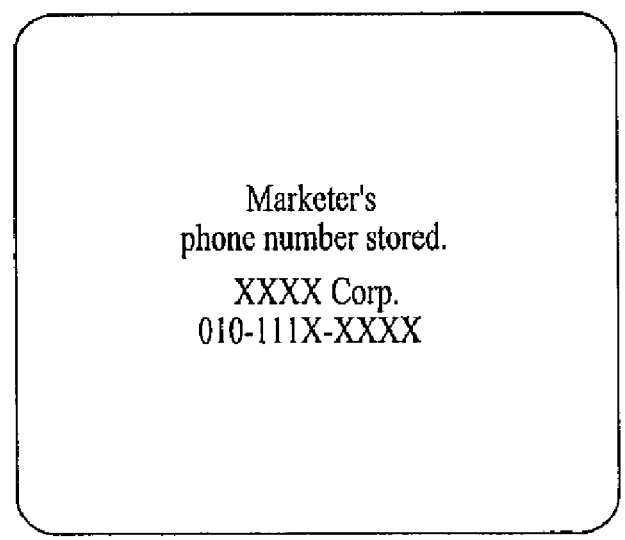

Further, if the user selects the phone symbol 430 from the displayed symbols 410, 420 and 430 to make a phone call connection to a marketer, the controller 180 connects the phone call with the home shopping product marketer via the wireless communication module 112. FIG. 8(g) illustrates an example of the controller 180 displaying status information indicating that a call connection is in progress on a prescribed area 431 of the broadcast play image. Further, as shown in FIG. 8(h), the controller 180 can store the phone number of the marketer in the memory 160 according to a selection made by the user.

Figure 8I:

As shown in FIG. 8(i), if the user selects the message symbol 420 from the symbols 410, 420 and 430, the controller 180 displays a window 421 on a prescribed area of the broadcast play image that the user can use for inputting a content of a message to be sent to the marketer.

Figure 8J:
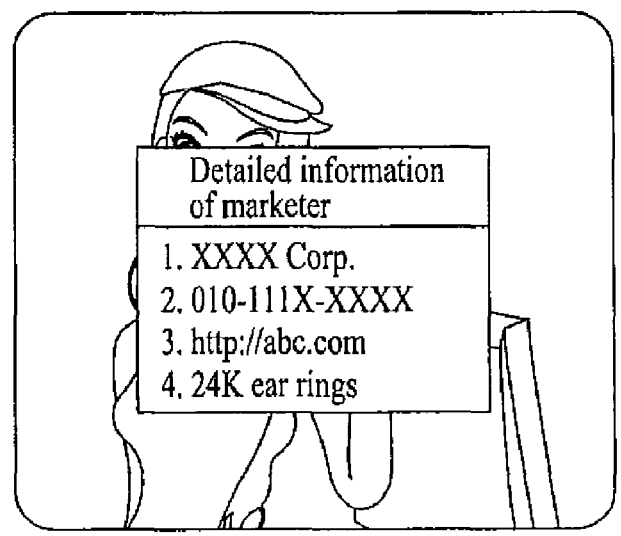
Figure 8K:
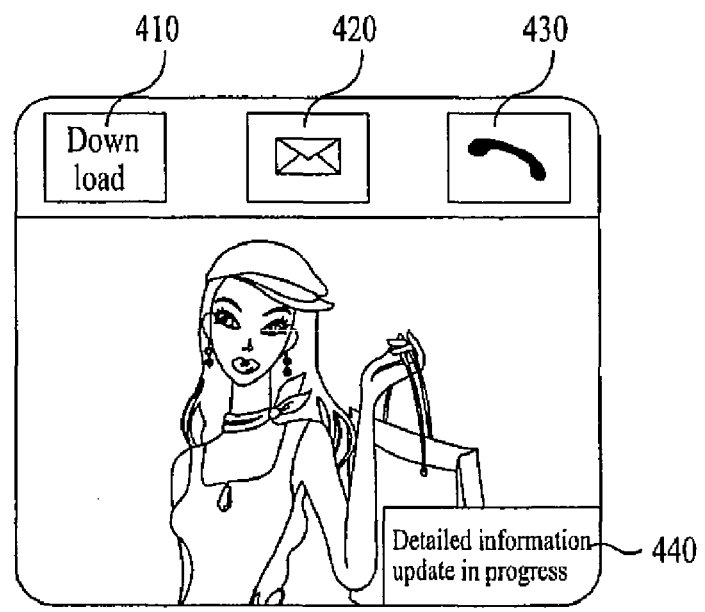
Figure 8L:
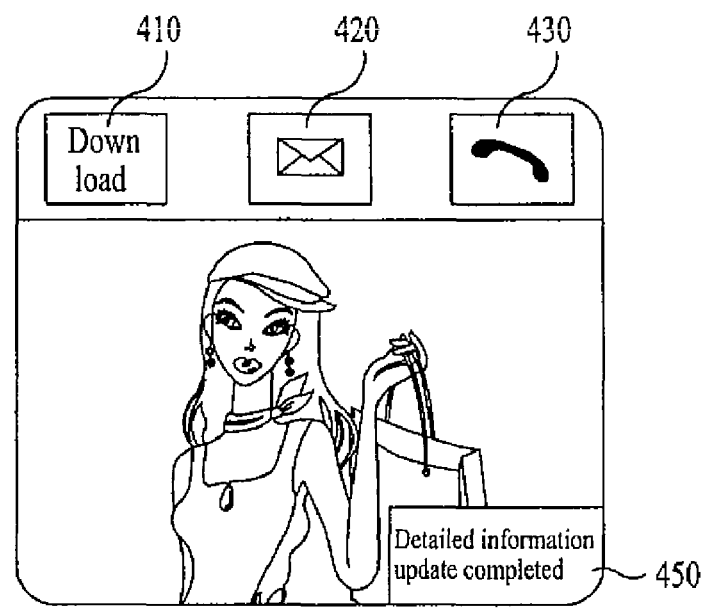

Also, as shown in FIG. 8(j), if the user selects the phone symbol 430, the controller 180 displays detailed information about the marketer on the broadcast play image or in another area of the display screen. Further, as shown in FIG. 8(k), if the detailed information is being updated through a currently received broadcast signal, the controller can display a window 440 including information indicating that the detailed information is being updated. As shown in FIG. 8(l), when the update of the detailed information is completed, the controller 180 displays a window 450 including information indicating the update is completed.

Figure 9A:
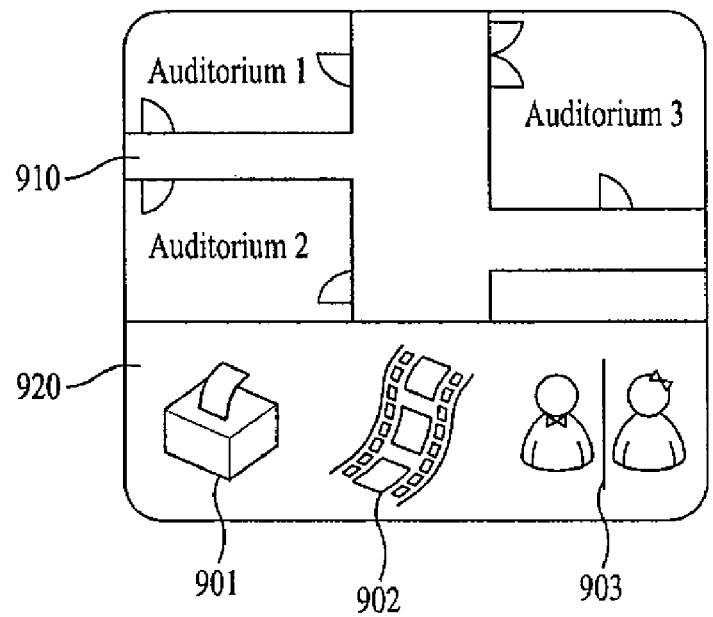
FIGS. 9(a) to 9(c) are diagrams illustrating display screens for interactive function implementations according to another embodiment of the present invention.
Figure 9B:
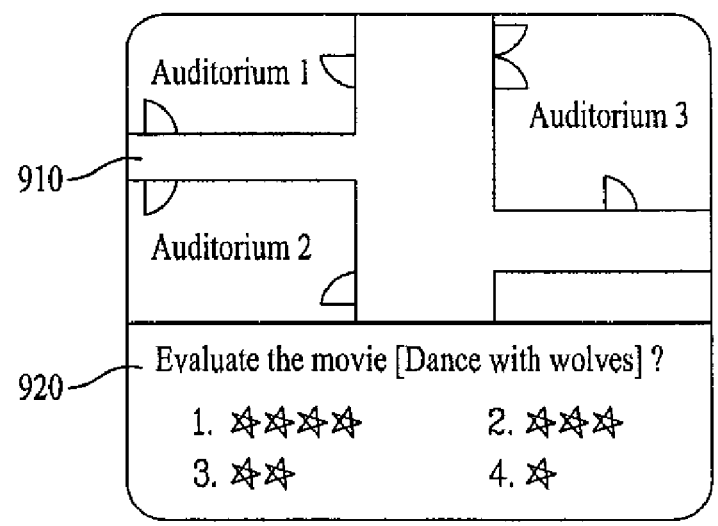
Figure 9C:
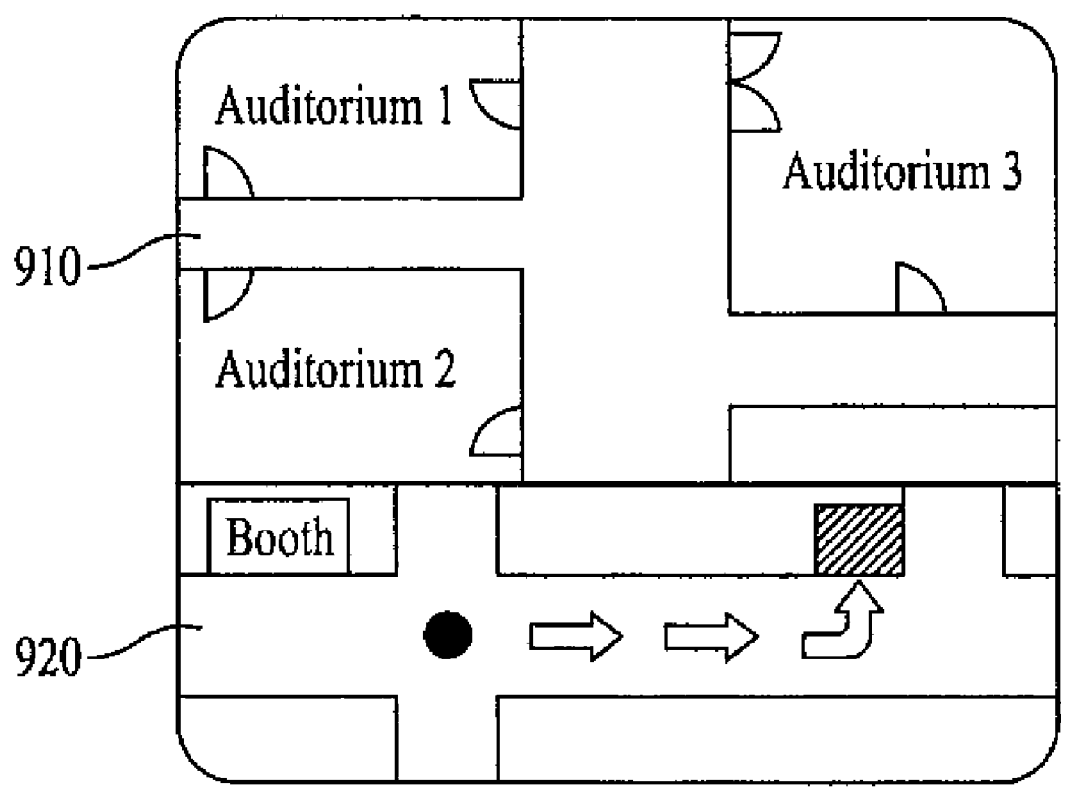

Next, FIGS. 9(a) to 9(c) are diagrams illustrating an interactive function implementation according to another embodiment of the present invention. As mentioned above, the received signal including the interactive can be a digital broadcast signal, a signal provided via a mobile communication network and a signal provided via a short-range wireless network. The following description refers the signal as being received from a short-range wireless communication device installed in a theater.

In more detail, FIG. 9(a) is a diagram illustrating an example in which information received from a short-range wireless communication device is displayed in a theater environment. In this example, the received information can be displayed on a user's mobile terminal when they enter the theatre or are within range of the wireless communication device or via one or more kiosks positioned throughout the theater so that the user can view information about a particular movie being displayed. Thus, in FIG. 9(a), the user can view the location of the different auditoriums in a screen area 910 of the terminal, and can select interactive functions 901, 902 and 903 from a screen area 920.

In more detail, the screen area 910 includes information about different movies that are being played in the respective auditoriums such as the location of the auditoriums, the prices of the movies, the actually movie being played in each auditorium, the Parental Guidance rating for each movie, the actors and actresses starring in the movie, the length of the movie, the starting times of the movies, etc.

The symbols 910, 902 and 903 displayed in the screen area 920 indicating interactive functions can be provided via the wireless communication device in the theater or can be stored in a memory of a user terminal or kiosk. In the example in FIG. 9(a), the symbol 901 represents a vote box indicating an interactive function capable of reflecting a user's opinion, the symbol 902 represents an interactive function for viewing a preview of a movie that is now showing or to be shown, and the symbol 903 provides the user information indicating where the restrooms are located.

FIG. 9(b) shows an example of an operation when the user selects the symbol 901. As shown, the theater guide video is still displayed in the screen area 910, and the voting information is displayed in the screen area 920. For example, the displayed information can be a question asking the user about their opinion about a particular movie (e.g., 'Dancing with the wolves'). The user can then cast their vote about the particular movie using a keypad or a navigation key on the terminal. Alternatively, when the display screen 920 is a touch screen, the user can simply touch the corresponding area of the touch screen to cast their vote.

Thus, in this embodiment, the theatre can store information about votes collected for particular films or movies, and then display the gathered information to users so other users can see whether previous viewers enjoyed a particular movie. The information may also be used by the theatre to determine what movies are being enjoyed most by their customers, and then customizing their marketing strategy.

FIG. 9(c) shows an example of operation when the user selects the symbol 903. As shown, the controller 180 displays information about the location of restroom included in the theatre in the screen area 920, while the information about the theater is still displayed in the screen area 910.

In the example shown in FIG. 9(c), the current location of the user is displayed in the screen area 920 as well as the direction to the closest restroom. Thus, in this embodiment, the controller 180 also calculates the distances between the user and the restrooms. Further, the above embodiment using short wave communication also applies to an exposition, an exhibition, a department store, a large-scale restaurant or the like.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some instances, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

The mobile terminal 100 may be implemented in a variety of different configurations. Examples of such configurations include a folder-type, slide-type, bar-type, rotational-type, swing-type and combinations thereof.

Accordingly, the present invention displays information on interactive functions in various ways, thereby facilitating a user to recognize the corresponding interactive function.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
    an input unit;
    a broadcast receiving unit configured to receive a broadcast signal including at least one interactive function for participating in a broadcast corresponding to the broadcast signal;
    a display unit configured to display the broadcast;
    a memory configured to store at least one symbol indicating a broadcast participation type of the at least one interactive function; and
    a control unit configured to play the broadcast, to search the at least one interactive function synchronized with a currently broadcast scene on the display unit in the received broadcast signal, to recognize the broadcast participation type of the searched interactive function, to search the memory for the symbol indicating the recognized broadcast participation type of the searched interactive function, to control the display unit to display the searched symbol on the currently broadcast scene, and to control an operation of the interactive function corresponding to the displayed symbol according to a signal provided via the input unit.

2. The mobile terminal of claim 1, wherein the broadcast signal is a data broadcast signal.

3. The mobile terminal of claim 1, wherein the control unit is further configured to store the broadcast signal in the memory.

4. The mobile terminal of claim 1, wherein the interactive function includes at least one of a message sending function, a phone call connection function, a wireless Internet connection function, a voting function, an information upload/download function and a video communication function.

5. The mobile terminal of claim 1, wherein the symbol includes at least one of a text, an image, an icon, a 3-dimensional image and an animation or any combination thereof.

6. The mobile terminal of claim 1, wherein the control unit is further configured to change a display position or a display arrangement of the symbol according to a key signal provided via the input unit.

7. The mobile terminal of claim 1, wherein the display unit includes a touchscreen, and
wherein the control unit is further configured to change a display position or a display arrangement of the symbol according to a touching action performed on the symbol.

8. The mobile terminal of claim 1, wherein the symbol is received via at least one of a broadcasting network, a mobile communication network, the Internet and the memory.

9. The mobile terminal of claim 1, wherein if a specific key signal is inputted via the input unit, the control unit is further configured to control the display unit to display the symbol for a prescribed duration.

10. The mobile terminal of claim 1, wherein the control unit is further configured to control the display unit to have the symbol periodically blink, to be overlaid on a main screen of the display unit, to be displayed as semi-transparent, to be displayed on an outer area of a main screen, or to be displayed using an OSD (on screen display).

11. The mobile terminal of claim 1, wherein if the symbol searched by the control unit includes a plurality of symbols, the control unit is further configured to control the display unit to display the plurality of the symbols to be discriminated from each other according to preset priorities, frequencies or significances of the symbols.

12. The mobile terminal of claim 1, wherein if the symbol searched by the control unit includes a plurality of symbols, the control unit is further configured to control the display unit to display the plurality of the symbols as a list, a grid or in a rotation manner.

13. The mobile terminal of claim 1, further comprising:
an output unit configured to output a vibration or sound indicating the broadcast participation type of the interactive function.

14. The mobile terminal of claim 1, wherein the memory is further configured to store execution relevant information of the interactive function.

15. The mobile terminal of claim 1, wherein the control unit is further configured to control the display unit to display detailed information about the interactive function corresponding to the symbol.

16. A method of controlling a mobile communication terminal, the method comprising:
receiving a broadcast signal including at least one interactive function for participating in a broadcast corresponding to the broadcast signal;
storing at least one symbol indicating a broadcast participation type of the at least one interactive function in a memory of the terminal;
playing the broadcast corresponding to the received broadcast signal on a display unit of the terminal;
searching the at least one interactive function synchronized with a currently broadcast scene on the display unit in the received broadcast signal;
recognizing the broadcast participation type of the searched interactive function;
searching the memory for the symbol indicating the recognized broadcast participation type of the searched interactive function;
displaying the searched symbol on currently broadcast scene;
controlling an operation of the interactive function corresponding to the displayed symbol according to a signal provided via an input unit of the terminal.

17. The method of claim 16, wherein the broadcast signal is a data broadcast signal.

18. The method of claim 16, wherein the storing step further comprises storing the broadcast signal in the memory.

19. The method of claim 16, wherein the interactive function includes at least one of a message sending function, a phone call connection function, a wireless Internet connection function, a voting function, an information upload/download function and a video communication function.

20. The method of claim 16, wherein the symbol includes at least one of a text, an image, an icon, a 3-dimensional image and an animation or any combination thereof.

21. The method of claim 16, further comprising:
changing a display position or a display arrangement of the symbol according to a key signal provided via the input unit.

22. The method of claim 16, wherein the display unit includes a touchscreen, and
wherein method further comprises changing a display position or a display arrangement of the symbol according to a touching action performed on the symbol.

23. The method of claim 16, wherein the symbol is received via at least one of a broadcasting network, a mobile communication network, the Internet and the memory.

24. The method of claim 16, wherein if a specific key signal is inputted via the input unit, the displaying step displays the symbol for a prescribed duration.

25. The method of claim 16, wherein the displaying step displays the symbol to periodically blink, to be overlaid on a main screen of the display unit, to be displayed as semi-transparent, to be displayed on an outer area of a main screen, or to be displayed using an OSD (on screen display).

26. The method of claim 16, wherein if the symbol searched by the searching step includes a plurality of symbols, the displaying step displays the plurality of the symbols to be discriminated from each other according to preset priorities, frequencies or significances of the symbols.

27. The method of claim 16, wherein if the symbol searched by the searching step includes a plurality of symbols, the displaying step displays the plurality of the symbols as a list, a grid or in a rotation manner.

28. The method of claim 16, further comprising:
outputting a vibration or sound indicating the type of the broadcast participation interactive function.

29. The method of claim 16, wherein the storing step further comprises storing execution relevant information of the interactive function.

30. The method of claim 16, wherein the displaying step further comprises displaying detailed information about the interactive function corresponding to the symbol.

* * * * *